United States Patent Office 3,048,553
Patented Aug. 7, 1962

3,048,553
BLENDING WAX WITH AN ETHYLENE-VINYL ACETATE COPOLYMER
John Moss, Lewiston, N.Y., assignor to E. I. du Pont de Nemours and Company, Wilmington, Del., a corporation of Delaware
No Drawing. Filed Dec. 31, 1959, Ser. No. 863,117
3 Claims. (Cl. 260—28.5)

This invention relates to compositions containing ethylene/vinyl acetate copolymers and petroleum wax, and in particular to a new process for blending the wax and copolymer.

Compositions containing from about 1 to about 60% by weight of an ethylene/vinyl acetate copolymer in admixture with about 99 to 40% by weight of petroleum wax are known to be of value as moisture-vapor-resistant, heat sealable, and flexible coatings for paper and cloth products. Compositions containing smaller amounts of wax, down to about 5% by weight, are useful for blending with additional ingredients to prepare a wide variety of protective or decorative coating compositions or adhesives. In particular, ethylene/vinyl acetate copolymer compositions containing a minimum of 15% by weight petroleum wax up to about 25% by weight, have been found to be especially useful for the preparation of a variety of ethylene/vinyl acetate copolymer-wax compositions by compounding with additional wax.

In the preparation of these ethylene/vinyl acetate copolymer-wax compositions directly from the two ingredients, long agitation times or use of costly, high shear equipment, or both, are required. Moreover, elevated temperatures within the range of 90 to 150° C. are required to speed the solution or solvation of the ethylene/vinyl acetate copolymers and these temperatures aggravate the degradation of the petroleum wax due to air oxidation.

Accordingly, it is an object of this invention to provide a new process for the preparation of ethylene/vinyl acetate-wax compositions containing about 5 to 99% by weight of petroleum wax. Another object is to provide a process for blending wax and ethylene/vinyl acetate copolymers which avoids contact of the wax with air at elevated temperatures. A further object is to eliminate the use of costly, high shear equipment for preparation of ethylene/vinyl acetate copolymer-wax blends.

These and other objects are attained in accordance with this invention by adding molten petroleum wax to the substantially anhydrous reaction mixture obtained from the elevated temperature, high pressure bulk copolymerization of ethylene and vinyl acetate. This reaction mixture contains the ethylene/vinyl acetate copolymer and unreacted ethylene and vinyl acetate monomers. The molten wax is added after the desired extent of copolymerization has been obtained and prior to complete pressure letdown of the reaction mixture to separate the unreacted monomers from the product copolymer. The wax may be added to the polymerization mixture at polymerization pressure or it may be added after partial pressure letdown of the mixture. In order to obtain the advantages of effective mixing of the wax with the polymer, however, the pressure should not be reduced below about 250 atmospheres before addition of the wax. After the introduction of the wax, the remaining pressure on the reaction mixture is released in the usual way for ethylene and ethylene/vinyl acetate polymerizations to yield a uniform blend of wax and ethylene/vinyl acetate copolymer.

The copolymerization of ethylene and vinyl acetate may be carried out batchwise or continuously in the presence of a catalyst, such as an organic peroxide, e.g. tertiary-butyl hydroperoxide, at a pressure from 300 to 3000 atmospheres preferably 1000 to 3000 atmospheres, and at a temperature, of about 100 to 250° C. A tubular reactor, stirred autoclave, or other equipment capable of withstanding the high pressures required for the copolymerization may be used. The petroleum wax should be introduced after the desired extent of polymerization has occurred, since wax is a chain transfer agent and lowers the molecular weight of the product if present during the polymerization. If a continuous polymerization process is used, the wax should be added at a point effectively removed from the polymerization zone so that there will be no back-mixing of the wax into the ingredients undergoing polymerization. Since the method of wax addition of this invention avoids contact of the wax with air at high temperatures, oxidative degradation is minimized and a wax antioxidant is not required during the blending process. If, however, the wax contains an antioxidant to protect against degradation during subsequent uses of the compositions, special care is usually exercised to prevent the wax from contact with the polymerizing monomers, since the antioxidants are polymerization inhibitors. In certain cases, however, it is desirable to stop the polymerization and this can be accomplished effectively by adding wax containing an antioxidant to the polymerizing monomers. Suitable antioxidants include hydroquinone, 3-tertiary-butyl-4-hydroxyanisole, 2,6-di-tertiary-butyl-4-methylphenol, di-tertiary-butyl-para-cresol, and phenyl-α-naphthylamine.

Addition of the wax to the reaction mixture comprising the ethylene/vinyl acetate copolymer and unreacted ethylene and vinyl acetate monomers is usually carried out at the same temperature as used during the polymerization, provided the temperature is above the melting point of the wax.

The ethylene/vinyl acetate copolymers of special value for use in wax compositions contain about 15 to 40% of polymerized vinyl acetate and have an inherent viscosity as measured at a concentration of 0.25% by weight in toluene at 30° C. of about 0.5 to 1.5. Polymers of this type may be readily obtained by the bulk polymerization method described previously. As is well-known in the art, the vinyl acetate content of the polymer is determined by the ethylene-vinyl acetate ratio in the monomer feed. The inherent viscosity is affected by the polymerization conditions. Thus, a decrease in temperature or increase in pressure leads to higher molecular weight products, that is, products with a higher inherent viscosity.

The petroleum wax which is added by my process may be any of the typical commercial products having a melting point within the range of about 125° to about 200° F. and includes both paraffin waxes and microcrystalline waxes. The amount of wax used may be sufficient to provide all that is needed in the final ethylene/vinyl acetate copolymer-wax composition, that is, from about 99 to 5% by weight of the final composition. A preferred ethylene/vinyl acetate copolymer-wax composition to be prepared by my method contains an amount of wax corresponding to 15 to 25% by weight of the combined wax and ethylene/vinyl acetate copolymer. This preferred composition contains the minimum of 15% wax which is required to provide sufficient solvation of the ethylene/vinyl acetate copolymer chains to permit easy incorporation of additional wax.

It is sometimes desirable to use the so-called "center-cut" of paraffin wax for preparation of ethylene/vinyl acetate copolymer-wax compositions containing 15 to 25% wax by the process of this invention. This "center-cut" material contains only those wax constituents which are common to all of the wide variety of paraffin waxes available.

The invention is further illustrated by the following example.

Example

A stainless steel rocker bomb of 1400 ml. capacity was charged with 160 g. vinyl acetate and 0.40 g. tertiary-butyl peroxide. The bomb was sealed, pressured with ethylene and heated at 135° C., 300 atmospheres pressure, for 3 hours. These conditions normally produce an ethylene/vinyl acetate copolymer having an inherent viscosity as measured at 0.25% concentration by weight in toluene at 30° C. of 0.5.

While maintaining the bomb at 135° C. and 300 atmospheres, 15 ml. (11.7 g.) of molten paraffin wax (M.P. 143-150° F.) was injected. After agitating for 30 minutes, the bomb was cooled and discharged. The product was dried under vacuum at 55-60° C. to yield 103 g. of a homogeneous blend. The composition of the blend was: 88.6% ethylene/vinyl acetate copolymer, and 11.4% wax. The inherent viscosity of the blend, measured at 0.25% concentration in toluene at 30° C., was 0.43. Correcting for the wax content and assuming that the inherent viscosity of wax is negligible, the inherent viscosity of the copolymer was 0.48. Analysis of the blend by determination of the saponification number indicated that the copolymer contained 37% vinyl acetate.

The process of this invention provides a remarkably effective method of blending wax with ethylene/vinyl acetate copolymers. The effectiveness is apparently based on the solvent activity of the unpolymerized ethylene in the polymerization reaction mixture. That the ethylene has this solvent action is indeed surprising since the temperature of the wax addition, 100° to 250° C., is considerably above the critical temperature of the ethylene, namely 9.7° C. The unusual activity of the ethylene thus appears to be due to a dense, high pressure gas above its critical temperature acting as a mutual solvent for a liquid paraffin wax and a polymeric material. The method of this invention also provides another advantage in yielding a wax-ethylene/vinyl acetate copolymer blend which reduces the polymer handling problems in the later stages of the process, in which the polymer is converted to a commercially acceptable physical form.

The embodiments of the invention in which an exclusive property or privilege is claimed are defined as follows:

1. The process of blending a petroleum wax and an ethylene/vinyl acetate copolymer comprising adding said wax in molten form to a substantially anhydrous reaction mixture comprising said copolymer and unreacted ethylene and vinyl acetate, prior to letdown of the pressure of said reaction mixture below 250 atmospheres.

2. The process of claim 1 in which the wax is added to the reaction mixture under a pressure of 300 to 3000 atmospheres and at a temperature of 100 to 250° C.

3. The process of claim 1 in which the amount of petroleum wax added corresponds to 15 to 25% by weight of the combined wax and ethylene/vinyl acetate copolymer.

References Cited in the file of this patent
UNITED STATES PATENTS
2,877,196   Reding _____ Mar. 10, 1959